(12) United States Patent
Nakaegawa et al.

(10) Patent No.: US 6,170,644 B1
(45) Date of Patent: Jan. 9, 2001

(54) AIR-FLOATING BELT CONVEYOR DEVICE

(75) Inventors: Akira Nakaegawa, Yokohama;
Shinichi Sumino; Akihiko Yokozi,
both of Kitakyushu; Motohiro Shiraishi, Yukuhashi, all of (JP)

(73) Assignee: Bridgestone Corporation, Tokyo (JP)

( * ) Notice: Under 35 U.S.C. 154(b), the term of this patent shall be extended for 0 days.

(21) Appl. No.: 09/371,738

(22) Filed: Aug. 10, 1999

(30) Foreign Application Priority Data

Aug. 17, 1998 (JP) .................................................. 10-230945

(51) Int. Cl.[7] .................................................. B65G 15/60
(52) U.S. Cl. ............................................ 198/811; 198/818
(58) Field of Search .................................. 198/818, 821, 198/811, 841

(56) References Cited

U.S. PATENT DOCUMENTS

| 3,627,111 | * | 12/1971 | Hillinger | 198/811 |
| 4,984,681 | * | 1/1991 | Jonkers | 198/811 |
| 5,052,545 | * | 10/1991 | Gongen | 198/818 |
| 5,727,918 | * | 3/1998 | Arend et al. | 198/818 X |
| 5,829,577 | * | 11/1998 | Grisley | 198/811 |

FOREIGN PATENT DOCUMENTS

| 3-61206 | * | 3/1991 | (JP) | 198/811 |
| 7-206122 | | 8/1995 | (JP) . | |
| 1364563 | * | 1/1988 | (SU) | 198/811 |

OTHER PUBLICATIONS

European Search Report of Application No. EP 99 11 5872 with Abstract of this European Application identified as "XS 9911587210 MA" and designated as Abstract No. 99115872.6 listing two foreign patent documents as well as the Annex to the European Search Report on European Patent Application No. EP 99 11 5872.
International Publication No. WO 97/42107 of Int'l Application No. PCT/US97/07385 published Nov. 13, 1997 (Applicant: Grisley Inc. for Inventor: R. Paul Grisley).
British Patent Specification No. GB 1 402 275 published Aug. 6, 1975.

* cited by examiner

*Primary Examiner*—James R. Bidwell

(57) ABSTRACT

An endless belt rotates between a tail pulley and a head pulley. The belt is floated in a tubular belt support by blowing air out of air blowing bores of the belt support, and runs from the tail pulley to the head pulley. A ultra-high molecular polyethylene layer is applied on the inner circumferential surface of the belt support, opposing to the belt, thereby assuring smooth running of the belt.

9 Claims, 5 Drawing Sheets

AIR-FLOATING BELT CONVEYOR DEVICE

BACKGROUND OF THE INVENTION

The present invention relates to an air-floating belt conveyor device in which a belt is partially floated over a belt support to run by blowing air out of air outlets of the belt support.

JP-A-7-206122 discloses such a belt conveyor device having coaxial inner and outer tubes, an arcuate going path of an endless flexible belt which is wound between a pair of pulleys being passed through an inner tube, an arcuate return path being passed between the outer and inner tubes, running resistance of the belt being reduced by floating the belt by air which is blown out of air outlets which are formed at regular intervals at the lower part of the tubes.

There is a belt conveyor device in which going and return tubular belts are horizontally provided in parallel.

However, flow rate and pressure of air which is injected from the air outlet is not sufficient, so that the belt partially contacts on the belt support made of a steel pipe, thereby increasing running resistance of the belt significantly.

SUMMARY OF THE INVENTION

In view of the disadvantages in the prior art, according to the present invention, there is provided an air-floating belt conveyor device which comprises:

a pair of pulleys;

an endless belt which is wound around said pair of pulleys, and a belt support through which said belt is passed, said belt being floated by blowing air out of air blowing bores on said belt support so that the belt may run, low friction material which has low frictional resistance against said belt being applied on the inner circumferential surface of the belt support.

In the inner circumferential surface to which the low friction material is applied of the belt support, even if floating force is lowered owing to shortage in air flow rate which is blown out of the air blowing outlets or owing to lack in pressure, the belt merely contacts the low friction material layer, thereby preventing rapid increase of running resistance of the belt. Thus, load applied to drive means could be reduced, thereby improving durability of the belt and the belt supports.

BRIEF DESCRIPTION OF THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
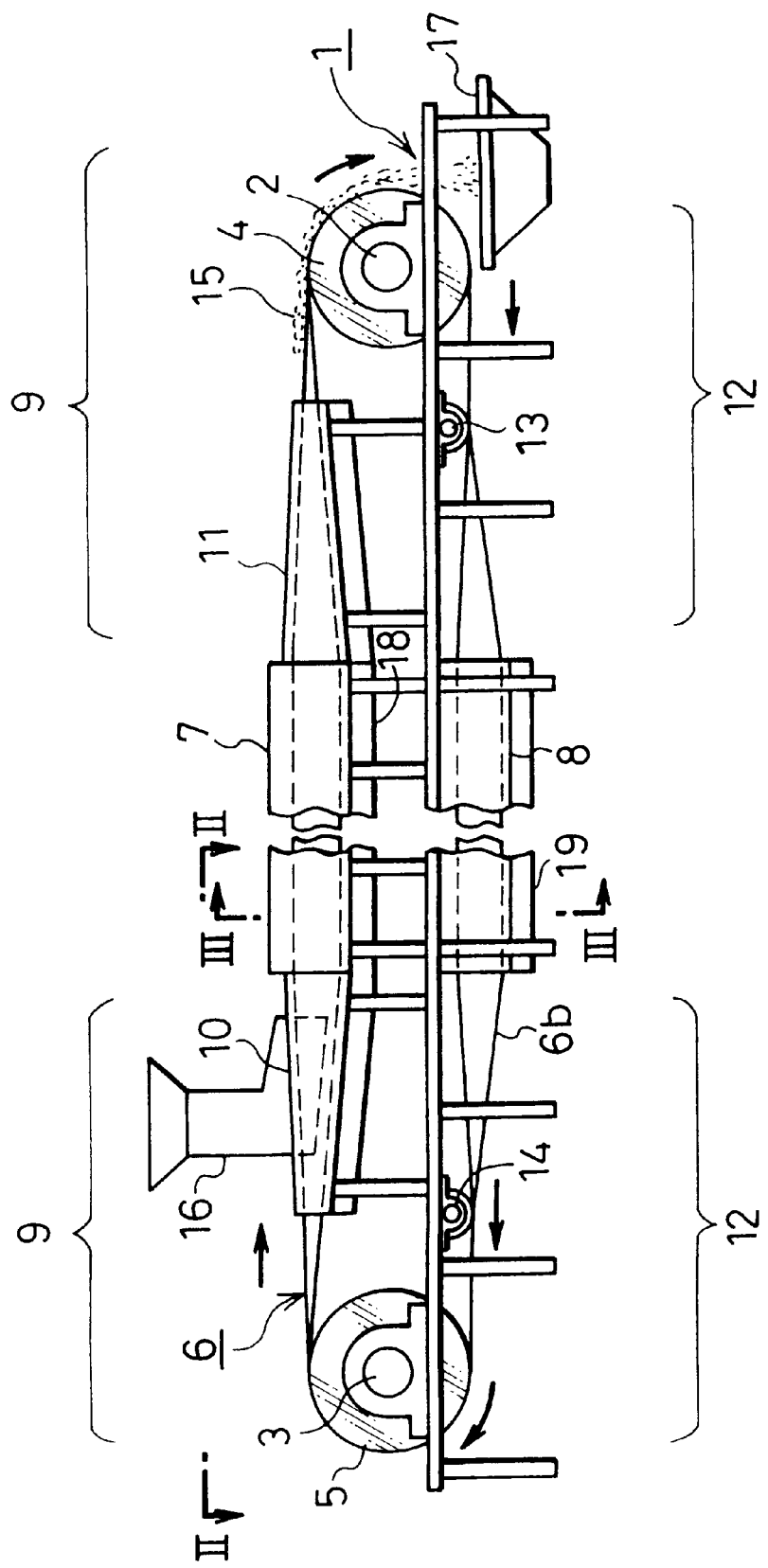
FIG. 1 illustrates a side elevational view of one embodiment of a belt conveyor device according to the present invention.
Figure 2:
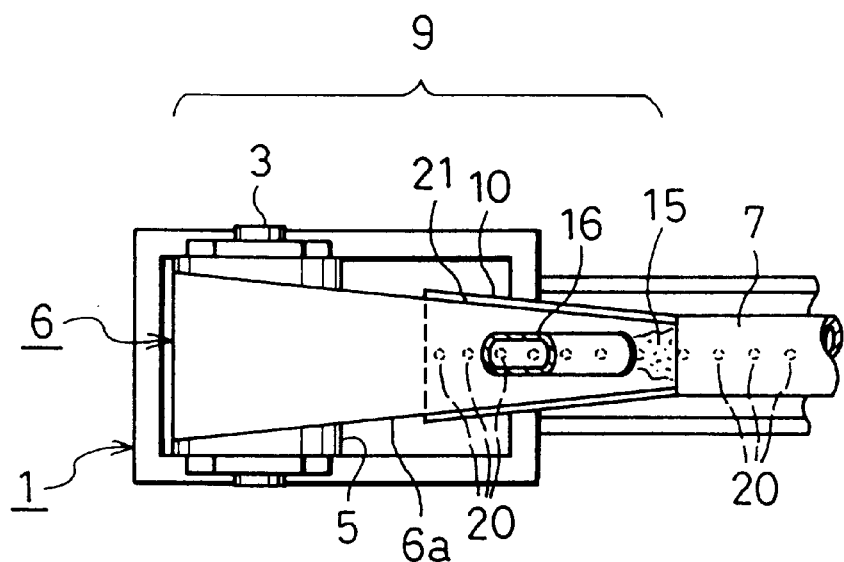
FIG. 2 is a horizontal sectional view taken along the line II—II in FIG. 1.
Figure 3:
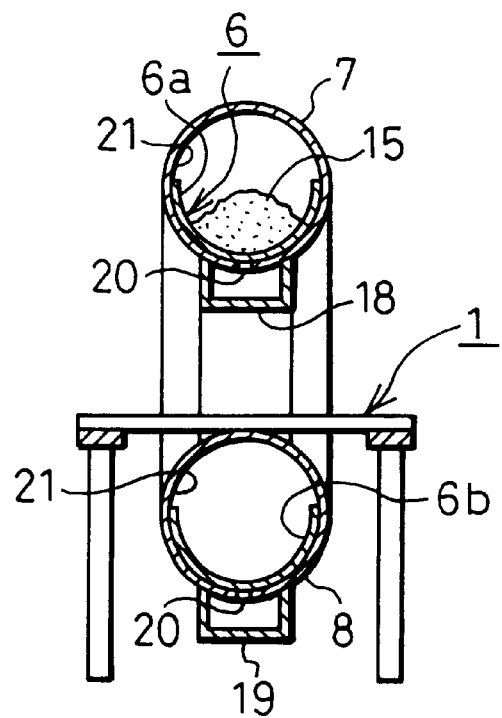
FIG. 3 is a vertical sectional view taken along the line III—III in FIG. 1.

As illustrated in FIGS. 1 to 3, an endless flexible flat belt 6 is wound around a head pulley 4 and a tail pulley 5 which have transverse shafts 2 and 3 respectively. The tail pulley 5 is driven and rotated by a motor (not shown), and the belt 6 is moved as shown by an arrow in FIG. 1.

A going path 6a and a return path 6b of the belt 6 are inserted in a pair of parallel belt supports 7 and 8 which are made of steel pipes mounted to a frame 1, the belt 6 having a semi-circular section.

Between the tail pulley 5 and one end of the belt support 7 and between the other end of the belt support 7 and the head pulley 4 in the going path, belt supports 10,11 are supported on the frame 1. The ends of the belt supports 10,11 have almost the same curvature as the lower half of the belt support 7, and curvature becomes larger gradually towards the tail pulley 5 or head pulley 4 to become a flat form finally.

Between the head pulley 4 and one end of the belt support 8 and between the other end of the belt support 8 and the tail pulley 5 in the return path, guide rollers 13,14 are pivotally mounted to the frame 1 over a trough converting portion 12.

Above a trough converting portion 9 of the going belt 6a, there is provided a chute 16 for feeding conveyed material 15 such as powder onto the going belt 6a, and a receiving hopper 17 under the head pulley 4. The conveyed material 15 fed from the chute 16 onto the going belt 6a passes through the belt supports 10,7,11 with the going belt 6a and thrown off onto the hopper 17 after it passes around the head pulley 4.

The return belt 6b which becomes empty after rotation around the head pulley 4 is returned through the belt support 8 to the tail pulley 5.

Under the belt supports 7,8 and the belt supports 10,11, air ducts 18,19 are provided along a running direction of the belt 6, and a plurality of air outlets 20 which communicate with the air ducts 18,19 are formed at regular intervals along the longitudinal direction in the middle of the bottom of each of the belt supports 7,8,10,11.

The air ducts 18,19 are connected at one end to a compressed air source (not shown), and compressed air supplied into the air ducts 18,19 is blown out of the air outlet 20 towards the lower surface of the belt 6 so that the belt 6 is slightly floated over the inner circumferential surface of the belt supports 7,8,10,11, thereby reducing running resistance of the belt 6 significantly compared with a belt supported by the rollers.

Figure 4:
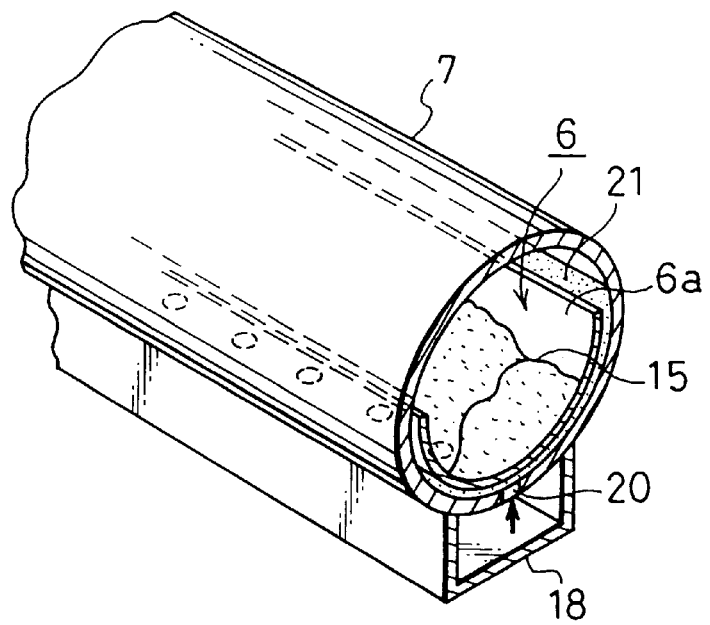
FIG. 4 is an enlarged perspective view of the main part.
Figure 5:
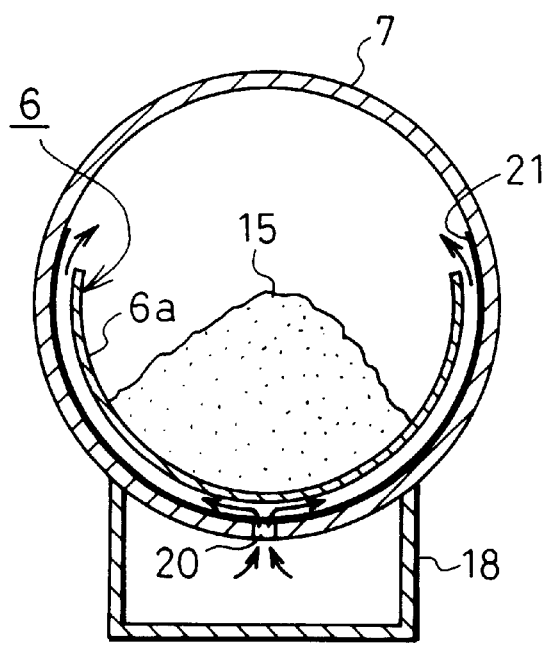
FIG. 5 is a vertical sectioned front view.

According to the present invention, in an air-floating belt conveyor device as above, as shown in FIGS. 4 and 5, a low friction material layer 21 is applied on the inner circumferential surface of the belt supports 7,8 slightly broader than the surface opposing to the belt 6, except the air outlets 20.

The low friction material layer 21 may be preferably substance which has low friction resistance and high wear resistance, polyethylene, polytetrafluoroethylene (Trademark: Teflon), polypropylene, nylon or stainless steel.

Especially, it may be preferably ultra high molecular polyethylene. "Ultra high molecular" means over 500,000 by viscosity-average molecular weight, preferably over 1,000,000.

When the belt normally runs with air floating, coefficient of friction between the conveyor belt and the support may be 0.01 to 0.02. If the belt is not floated in the air, coefficient of friction is 0.05 or 0.06 over 0.04. As the coefficient of friction increases, load is applied to a motor, so that the motor stops. The coefficient of friction of the low friction material may be preferably 0.01 to 0.04.

The low friction material 21 may be applied by adhesive, spraying or coating. The air outlet 20 is formed by penetration into the low friction material layer 21 after the layer 21 is formed. The surface of the low friction material layer 21 may be flat without roughness.

Figure 6:
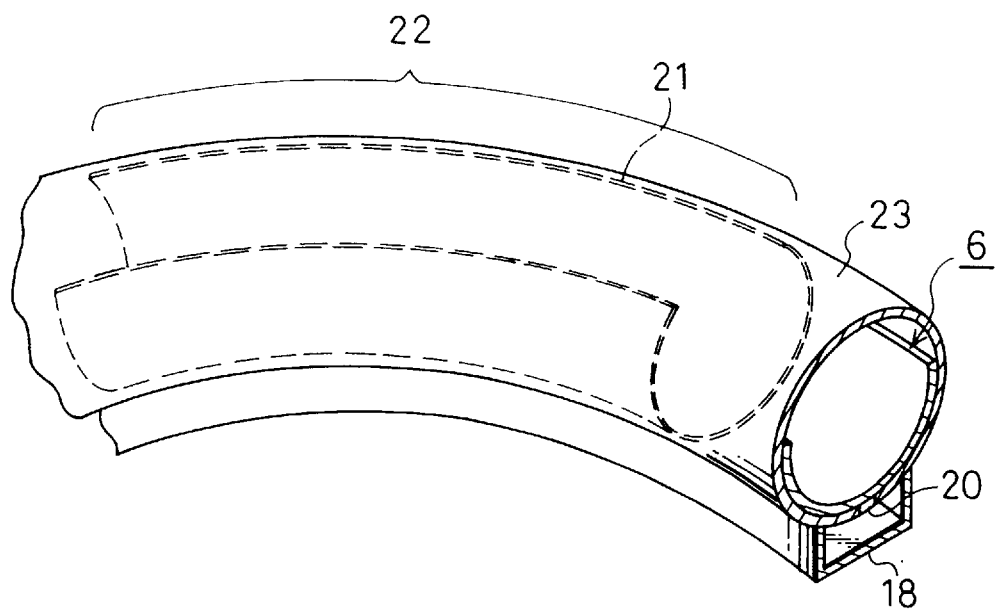
FIG. 6 is a perspective view of a horizontal curved portion of a belt.
Figure 7:
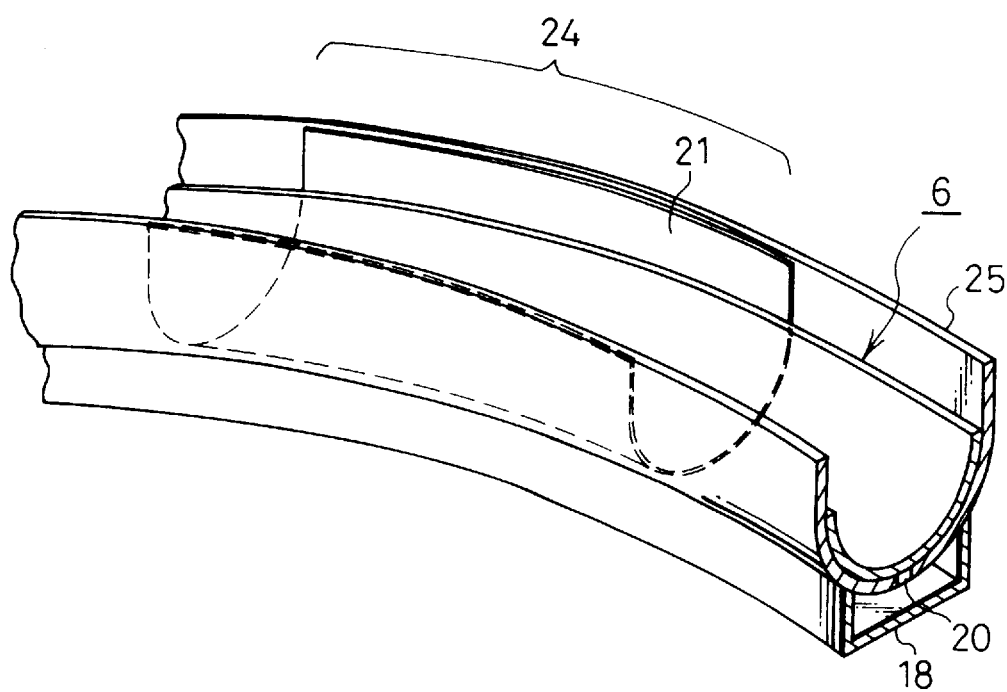
FIG. 7 is a perspective view of a vertical curved portion.
Figure 8:
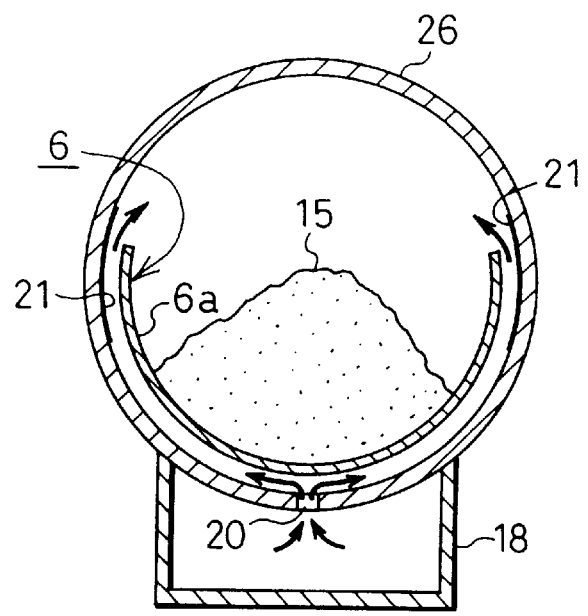
FIG. 8 is a vertically sectioned front view of a variation similar to that in FIG. 5.

In the above embodiment, the low friction material layer 21 is applied on the whole inner circumferential surface of the belt supports 7,8,10,11, but as shown in FIG. 6, the material 21 is applied to the inner circumferential surface of a cylindrical belt support 23 only at horizontal curved portion 22. As shown in FIG. 7, the material is applied only to the upper surface of a trough-shaped belt support 25 at a vertical curved portion 24, and as shown in FIG. 8, the material 21 is applied to only portion which opposes to the side ends of the belt 6. The portion has high contact pressure with the belt 6.

Figure 9:
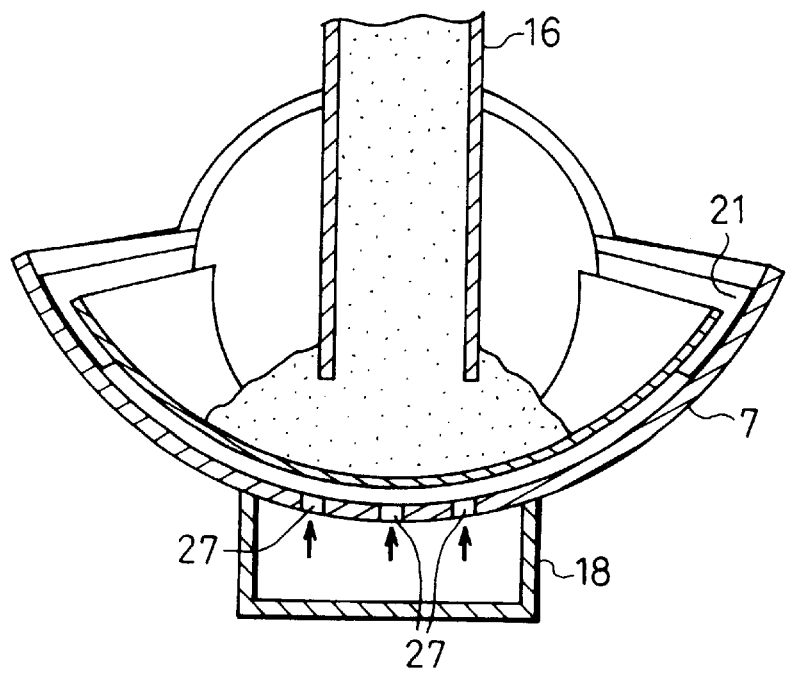
FIG. 9 is a vertically sectioned front view of a chute in another variation.

As shown in FIG. 9, low friction material layer 21 is applied to the side surfaces of the belt support 7 under the chute 16. Total bore area of the air blowing bores 27 per unit area under the chute 16 may be larger than total area of the air outlets 27 at other area by increasing the number and/or diameter of the outlets.

A flat belt 6 may run over a flat belt support, or a belt 6 may be rolled up into a tubular form in a tubular belt support.

The foregoing merely relates to embodiments of the present invention. Various modifications and changes may be made by persons skilled in the art without departing from the scope of claims wherein:

What is claimed is:

1. An air-floating belt conveyor device which comprises:
a pair of pulleys;
an endless belt which is wound around said pair of pulleys; and
a belt support, comprising a tube, through which said belt is passed, said belt being floated by blowing air out of air blowing bores of said belt support so that the belt may run, low friction material having a coefficient of dynamical friction of 0.01 to 0.04 and which has low frictional resistance against said belt being applied on an inner circumferential surface of the belt support which is slightly broader than portion opposing to the belt.

2. An air-floating belt conveyor device as defined in claim 1 wherein said low friction material is applied to opposing sides of the belt support.

3. An air-floating belt conveyor device as defined in claim 1 wherein a chute is provided at a beginning end, said low friction material layer being applied on an upper surface of the belt support under the chute, total area of the air blowing bores per unit area of the belt support below the chute being larger than in other parts of the belt support not beneath the chute.

4. An air-floating belt conveyor device as defined in claim 1 wherein the low friction material is selected from plastics consisting of polyethylene, Teflon, and nylon.

5. An air-floating belt conveyor device as defined in claim 4 wherein said polyethylene comprises ultra-high molecular polyethylene having viscosity-average molecular weight of over 500,000.

6. An air-floating belt conveyor device as defined in claim 4 wherein said polyethylene comprises ulta-high molecular polyethylene having viscosity-average molecular weight of over 1000,000.

7. An air-floating belt conveyor device as defined in claim 1 wherein said low friction material comprises stainless steel.

8. An air-floating belt conveyor device which comprises:
a pair of pulleys;
an endless belt which is wound around said pair of pulleys; and
a belt support through which said belt is passed, said belt being floated by blowing air out of air blowing bores of said belt support so that the belt may run, low friction material having a coefficient of dynamical friction of 0.01 to 0.04 and which has low frictional resistance against said belt being applied on an inner circumferential surface of the belt support, low friction material is applied on an upper surface of the trough-like belt support at vertical curved portion.

9. An air-floating belt conveyor device which comprises:
a pair of pulleys;
an endless belt which is wound around said pair of pulleys; and
a belt support, comprising a tube, through which said belt is passed, said belt being floated by blowing air out of air blowing bores of said belt support so that the belt may run, low friction material having a coefficient of dynamical friction of 0.01 to 0.04 and which has low frictional resistance against said belt being applied on an inner circumferential surface of the belt support opposing to the belt only at curved portion of the belt.

* * * * *